J. A. SHOREY.
APPARATUS FOR CALIBRATING U-TUBES FOR FLOW METERS AND THE LIKE.
APPLICATION FILED DEC. 26, 1916.
1,337,969.
Patented Apr. 20, 1920.
2 SHEETS—SHEET 1.
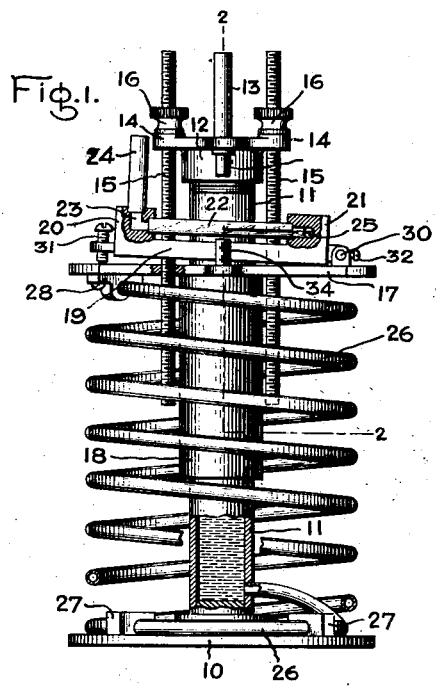
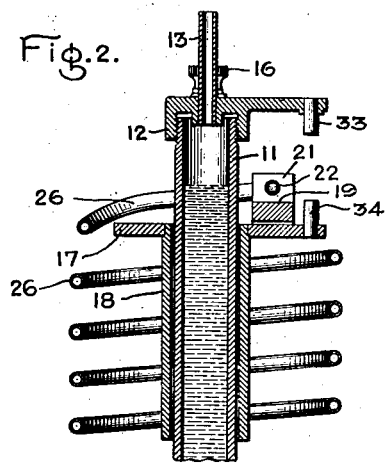
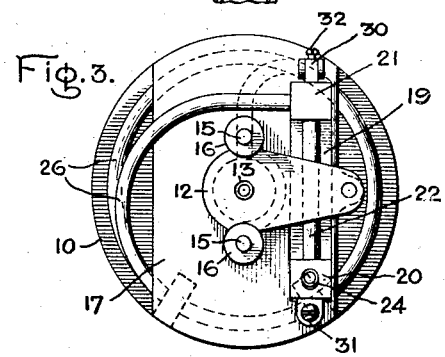
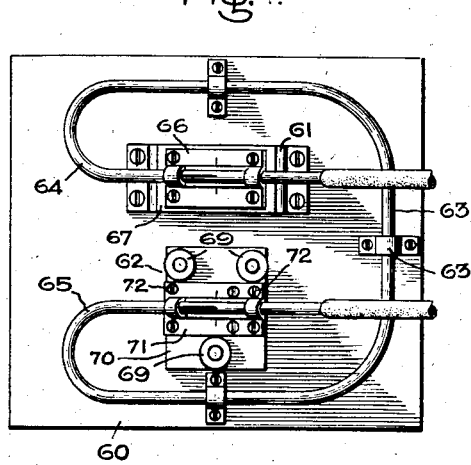
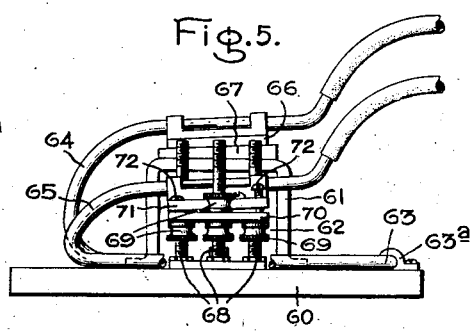
Inventor:
John A. Shorey,
by *Albert G. Davis*
His Attorney.

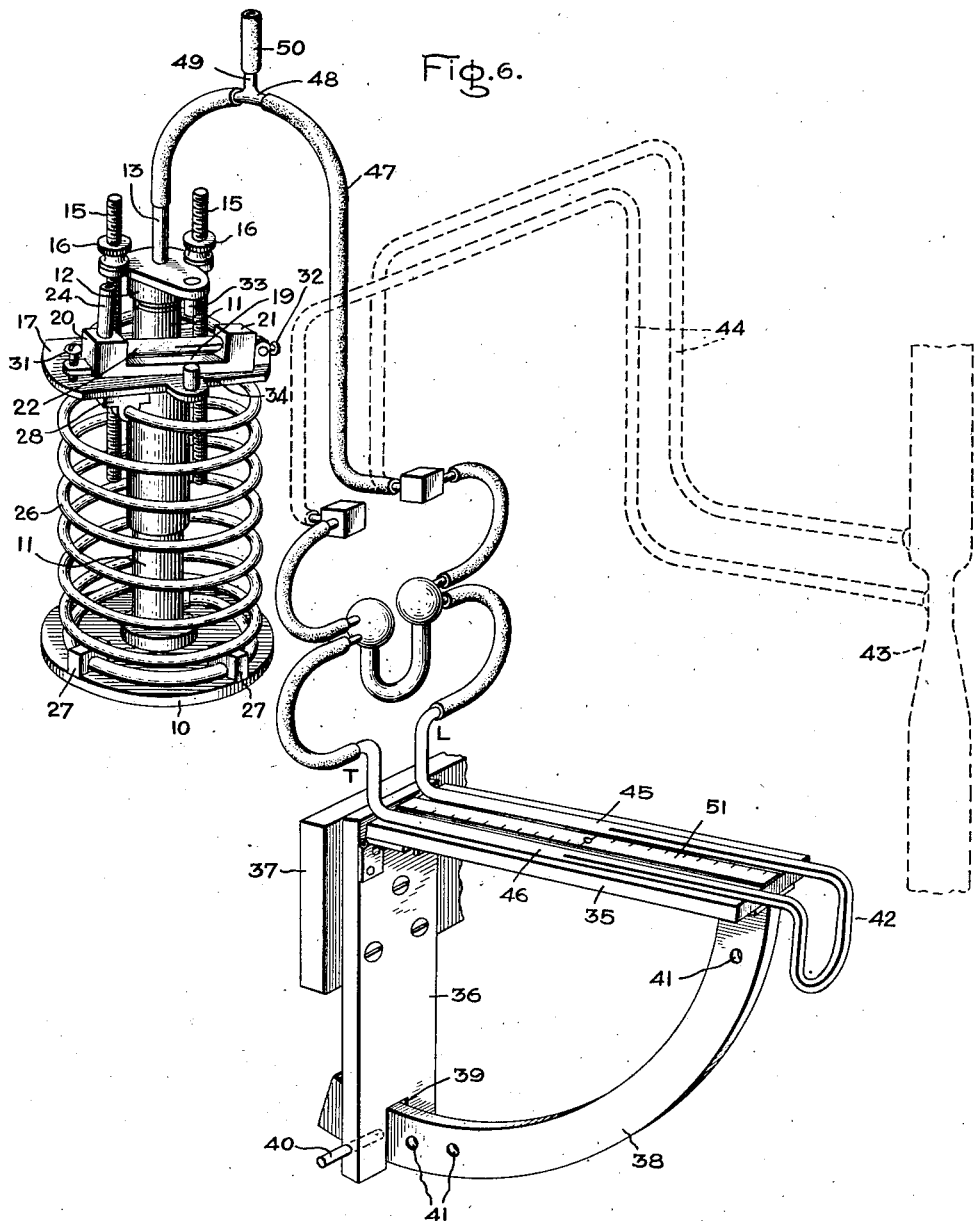

UNITED STATES PATENT OFFICE.

JOHN A. SHOREY, OF NEW YORK, N. Y., ASSIGNOR TO GENERAL ELECTRIC COMPANY, A CORPORATION OF NEW YORK.

APPARATUS FOR CALIBRATING U-TUBES FOR FLOW-METERS AND THE LIKE.

1,337,969.

Specification of Letters Patent.

Patented Apr. 20, 1920.

Application filed December 26, 1916. Serial No. 138,847.

*To all whom it may concern:*

Be it known that I, JOHN A. SHOREY, a citizen of the United States, residing at New York, county of New York, State of New York, have invented certain new and useful Improvements in Apparatus for Calibrating U-Tubes for Flow-Meters and the like, of which the following is a specification.

The present invention relates to flow meters and like apparatus wherein a U-tube is used for measuring a pressure difference, and has for its object to provide an improved apparatus for calibrating a U-tube so that exact measurements of the vertical deflections in the tube may be obtained.

In such apparatus the pressure difference is represented by the difference in the level of the liquid in the two legs of the U-tube measured in a vertical plane. If the bores of the two legs of the U-tube are perfectly uniform and accurate, and the two legs lie in exactly the same plane throughout their length and are absolutely parallel to each other, then for any total deflection the same proportionate amount will occur in each leg. Considering for example the case of a U-tube having a perfectly uniform bore and with its two legs parallel and lying in the same vertical plane. If a total deflection of two inches occurs, then there will be a deflection of one inch in each leg of the U-tube, the level of the indicating fluid being lowered one inch on the leading side and raised one inch on the trailing side. As a matter of fact, however, absolutely uniform bores for U-tubes cannot be obtained, particularly when glass tubing is used, nor can the two legs be positioned absolutely parallel and made to lie in exactly the same plane throughout their length, so that for successive increments of deflection the same proportionate amount will not occur in each leg of the U-tube, and for this reason it is necessary that the U-tube be calibrated if very accurate results are to be obtained.

For the more accurate measurement of small pressure differences it is sometimes desirable to place the U-tube in a plane at an acute angle to the horizontal so as to obtain a larger relative deflection and, of course, with such an arrangement, due to the greater deflections, the percentage of error is increased. With such an angular arrangement of U-tube, errors are also more likely to occur due to the two legs being slightly warped or twisted, or to their not lying in exactly the same horizontal plane throughout their length.

I have found my improved apparatus to be particularly useful in connection with flow meters wherein the U-tube is placed at a small angle with the horizontal, for example, about three degrees, and with which it is desired to obtain very accurate indications of small pressure difference. It will be understood, however, that the invention is not limited to this use, nor is it limited to U-tubes for flow meters only.

For a consideration of what I believe to be novel and my invention, attention is directed to the accompanying specification and the claims appended thereto.

In the accompanying drawings, Figure 1 is a side elevation partly in section of a calibrating apparatus embodying my invention; Fig. 2 is a vertical sectional view taken on line 2—2, Fig. 1; Fig. 3 is a top plan view of the apparatus of Fig. 1; Fig. 4 is a top plan view of another form of calibrating apparatus embodying my invention; Fig. 5 is a side elevation of the apparatus of Fig. 4, and Fig. 6 shows the calibrating apparatus of Figs. 1 to 3 connected with a U-tube for calibrating it.

Referring to Figs. 1, 2 and 3, 10 indicates a base upon which is mounted a vertically extending tube 11 forming one leg of a U-tube. The top of tube 11 is closed by a cap 12 through which extends a small pipe 13. Projecting from the cap 12 are two ears 14 having openings therein through which two threaded supporting standards 15 extend. The standards 15 do not thread into the openings in the ears 14, but extend loosely through them, and are supported by nuts 16 threaded onto their upper ends. Supported on the lower ends of the standards 15 is a platform 17 to the center of which is fixed a guide sleeve 18 surrounding the tube 11. By screwing the nuts 16 the platform can be raised and lowered on the tube 11. The guide sleeve 18 serves to hold the platform 17 horizontal and to guide it in its vertical movement.

Supported on the platform 17 is a frame comprising a base 19 having angular projections 20 and 21, between which is supported a short glass tube 22. In projection 20 is a passage 23 which communicates at one end with the glass tube 22 and at the other end with a short vertically extending pipe 24. In the projection 21 is a passage 25 which communicates at one end with the glass tube 22 and at the other end with one end of a tube 26. The tube 26 is quite long and is bent so that its upper end may be moved in a vertical plane. In the present instance it is wound in the form of a helix preferably surrounding the tube 11. It has one end fastened to the projection 21 and the other end is fastened to the tube 11 and communicates with the interior thereof. The lower portion of the tube 26 is also firmly fixed to the base 10 by blocks 27, and the upper portion is fixed to the underside of the platform 17 by a block 28. The helical tube 26, glass tube 22, and pipe 24, form the other leg of a U-tube, the first leg being the tube 11, as already referred to. The frame which carries the glass tube 22 is arranged so that it may be adjusted relative to the platform 17 so as to cause the tube 22 to extend at an angle to the platform *i. e.*, to the horizontal. To this end the frame is shown as being suitably pivoted at one end, as indicated at 30, and as being provided with an adjusting screw for raising or lowering the other end, as indicated at 31. 32 indicates a set screw which locks the pivot 30 for clamping the frame in adjusted position. Carried by the cap 12 and platform 17 are two projecting lugs 33 and 34, between which a pair of inside calipers or micrometer may be inserted for measuring the exact distance between them.

The tubes forming the two legs of the U-tube of the calibrating instrument are filled to a desired level with a suitable indicating fluid. For measuring air with small pressure differences, I preferably employ kerosene suitably colored so that the meniscus will be very clear. The short glass tube 22 forms the reading portion of the U-tube and at a suitable point, preferably near its center, it is provided with a mark for what may be termed the zero point of the instrument. It is arranged at such an angle to the horizontal that the distance of the length of the tube represents but a very small vertical rise. By this arrangement the readings may be made very accurate.

Referring now to Fig. 6, 35 indicates a base member hinged at its rear end to a support 36 which may be fastened to a vertical member 37. The outer end of base member 35 is supported by a curved arm 38 which passes through a slot 39 in the lower end of the support 36 and is held in position by a pin 40 extending through an opening in support 36 into one of a series of openings 41 in the arm 38. The base member 35 carries a U-tube 42, which may form a part of a flow meter. Under such circumstances the same is connected to a suitable pressure difference creating device 43, as a Venturi tube, by pipes 44, as indicated by the dotted lines. With the connections as shown in the dotted lines, 45 is the leading leg of the U-tube and 46 the trailing leg. By removing pin 40 and turning the base 35 on its hinges, the U-tube 42 may be adjusted so as to be vertical or to occupy different angles with the horizontal. The openings 41 in arm 38 may be located to give the adjustments desired. For example, in the position as shown in the drawing the U-tube 42 may be assumed to be at such an angle as to give a vertical rise of one inch in twenty. For the other three openings shown the angle may be one inch in ten, one inch in five, and vertical.

When it is desired to calibrate the U-tube 42 for any given angular position, it is set in such position and its leading leg is connected by a flexible tube 47 to one leg or the other of the calibrating instrument. In the present instance I have shown it connected to the end of pipe 13. In the tube 47 is a T 48, to the third leg 49 of which is connected a short flexible tube 50, through which pressure may be admitted to both the leg 11 of the calibrating instrument and the leg 45 of the U-tube to be calibrated. The nuts 16 of the calibrating instrument are then operated to move platform 17 to bring the meniscus of the indicating fluid in the instrument to the zero point on the tube 22. 51 indicates a plate upon which the scale for the U-tube 42 is to be marked. The zero point on this scale is arbitrarily chosen at about midway between the ends of the legs of the U-tube and is marked thereon. The U-tube is then filled with indicating fluid up to this mark. The distance between the two legs 33 and 34 is measured and the nuts 16 are then adjusted so as to raise the platform 17 relative to the leg 11 by a certain exact amount. This movement tends to straighten out the bend or bends in the tube 26. This will move the glass tube 22 so that the meniscus no longer stands at the zero point on it, but is an amount below it depending on the amount the platform has been raised vertically. A pressure, as air pressure, is then applied to the fluid in the leg 11 through pipe 49 which pressure is just sufficient to bring the meniscus of the fluid back to the zero mark on the glass tube. This pressure may be applied in any suitable manner, as by blowing in the end of the tube, or applying pressure from a suitable source through a reducing valve or otherwise, and represents the pressure required to produce a vertical deflection in the fluid column of the amount which the platform 17 has been moved. The same pressure which is applied to the fluid in the leg 11 will also be applied to the fluid in the leg 45 of the U-tube being calibrated, since the two are connected together, and will likewise produce a deflection therein of the same amount vertically as the platform 17 was moved relative to the leg 11. The position of the menisci in the two legs 45 and 46 of the U-tube will then be marked. If, for example, the platform 17 was moved exactly one inch vertically relative to the leg 11, then the deflection of the liquid in the two legs 45 and 46 would represent a vertical rise of exactly one inch, and on the scale would represent a movement of about 20 inches, assuming that the U-tube being calibrated was located at an angle so that its inclination was one inch in twenty. Now by adjusting the platform various distances relative to the leg 11 of the calibrating instrument a complete scale can be determined for the U-tube being calibrated which will be wholly independent of and unaffected by any inaccuracies in the bore of the tube or in the relations of the two legs of the tube to each other. In the case of the calibrating instrument it will be noted that whenever the indicating fluid therein is brought to the position where the meniscus is at the zero point on the short glass tube 22, that the fluid in the indicating instrument then occupies exactly the same portion of the legs thereof. This means, therefore, that the accuracy of the instrument is wholly independent of any irregularities in the bore of the legs. Its accuracy will be the accuracy with which the meniscus may be read and the accuracy with which the two legs are adjusted vertically relative to each other. Since the glass tube 22 occupies a position at a very small angle to the horizontal, the position of the meniscus therein in terms of vertical deflection can be very accurately determined. On the other hand the two legs of the U-tube may be adjusted relative to each other by means of micrometer calipers so that this adjustment may be made extremely accurate. In the case of the U-tube being calibrated it will be seen that the points on the scale determined for it represent the actual vertical components of the movements of the indicating fluid measured by a micrometer and is unaffected by any inaccuracies in either the bore of the U-tube or the positioning of its legs.

Referring now to Figs. 4 and 5, I have here illustrated another form which my calibrating instrument may take. 60 indicates a base upon which is arranged a fixed standard 61 and an adjustable standard 62. Carried by the base 60 with its two ends supported on the standards 61 and 62 is a U-tube comprising a central portion 63 which connects the two legs 64 and 65. The central portion 63 of the U-tube is fixed to base 60 by a suitable clamp 63ᵃ. The leg 64 extends across the top of fixed standard 61 and is fastened thereto by a suitable frame 66 having a wedge-shaped base 67 so that the leg 64 extends at a slight angle to the top of the bracket and to the plane of the base 60. The adjustable standard 62 comprises three threaded posts 68 having adjustable nuts 69 thereon between which is supported a plate 70, the plate thus forming a support or platform having a three-point suspension. Carried by the plate is a frame 71 held in position by screws 72. The frame 71 extends at a slight angle to the plate 70 and to it is fixed the leg 65 of the U-tube. The screws 72 may be adjusted to bring frame 71 to the desired angle with the plate 70. What may be termed the zero point of the U-tube is located on the portion of the legs 64 and 65 which extend across the standard 61 and 62 and these portions are made of glass so the menisci may be read. The remaining portion of the U-tube may be formed of a glass tube or other material as found desirable. Preferably I construct the entire U-tube of a single piece of glass tubing. The leg 65 has a bend in it as shown and this renders it sufficiently flexible so that the plate 70 may be adjusted vertically, thus permitting one leg of the U-tube to be moved vertically relative to the other.

It will be seen that the apparatus of Figs. 4 and 5 is in principle the same as that of Figs. 1 to 3, and its use for calibrating purposes will be obvious from the description already given in connection with Fig. 6.

From a consideration of the foregoing it will be seen that by my improved method of calibrating I determine positively and with great accuracy the actual pressure required to produce a vertical deflection of a certain definite amount, and that I then apply this pressure to the U-tube to be calibrated. By the use of this method the accuracy of the calibration of the U-tube does not depend upon the accuracy of another instrument which itself must be calibrated. Also, every point on the scale for the U-tube being calibrated is separately determined with the same degree of accuracy, and does not depend upon the determination of any other point.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by any other means.

What I claim as new and desire to secure by Letters Patent of the United States, is:—

1. A calibrating instrument comprising a base, a U-tube having its lower portion and one leg fixed to the base, the other leg being vertically extensible, an indicating liquid in the U-tube, an indicating point on the leg of the U-tube, means for extending said extensible leg to move the indicating point away from the meniscus of the indicating liquid, means whereby the amount of such movement may be measured, and means whereby a pressure may be applied to a leg of the U-tube to bring the meniscus to the indicating point.

2. A calibrating instrument comprising a base, a U-tube having its lower portion and one leg fixed to the base, the other leg being vertically extensible and having an indicating point thereon, an indicating liquid in the U-tube, means for extending said leg to bring the meniscus to said indicating point, and means whereby the amount of such movement may be measured.

3. A calibrating instrument comprising a base and a U-tube supported thereon having two legs, one of which is vertically adjustable relative to the other, an indicating liquid in the U-tube, an indicating point on the adjustable leg, means for extending the adjustable leg vertically to bring the meniscus therein to the indicating point, and means for indicating the amount of such movement.

4. A calibrating instrument comprising a base and a U-tube supported thereon having two legs, one of which is vertically adjustable relative to the other, means for extending the adjustable leg, means whereby the amount of such extensions may be measured, said adjustable leg having a portion which extends at an acute angle to the plane of the base, and an indicating point on such portion.

5. In a calibrating instrument, the combination of a base, a vertically adjustable support thereon, a U-tube comprising two legs mounted on the base, and an adjustable frame on the support, said frame extending at an acute angle to the support, and one of said legs being fastened to said frame.

6. In a calibrating instrument, the combination of a base, a tube carried thereby and forming one leg of a U-tube, a support adjacent said tube and vertically adjustable relative to it, a second tube which forms the other leg of the U-tube, said second tube being bent so that its free end may be moved vertically, such tube adjacent its free end being carried by said support, an indicating liquid in the U-tube, an indicating point on one of said tubes, means for adjusting said support to move said indicating point relatively to the meniscus of said indicating liquid, and means whereby the amount of such movements may be measured.

7. In a calibrating instrument, the combination of a base, a tube carried thereby and forming one leg of a U-tube, a second tube carried by the base and forming the other leg of a U-tube, said last named leg being reversely bent on itself so that its outer end may be raised and lowered relative to the base, one of said legs having a section which makes an acute angle with the horizontal and upon which the zero of the instrument is marked, and means for raising and lowering the outer end of the second named leg.

In witness whereof I have hereunto set my hand this twenty first day of December, 1916.

JOHN A. SHOREY.